March 9, 1954
J. H. HULLINGER
2,671,350
MECHANICAL TRANSMISSION
Filed May 6, 1952
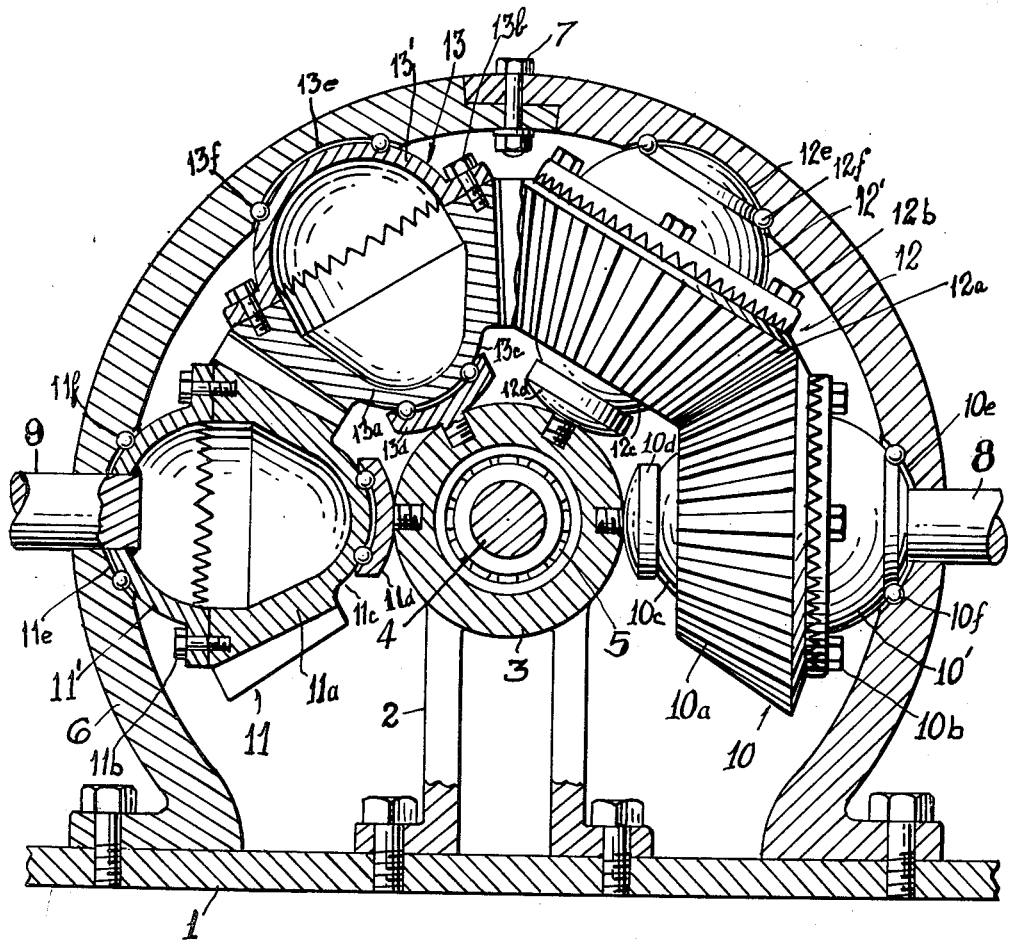
INVENTOR.
JOHN H. HULLINGER
BY
*JE Trabucco*
ATTORNEY Patented Mar. 9, 1954

2,671,350

UNITED STATES PATENT OFFICE 2,671,350

MECHANICAL TRANSMISSION

John H. Hullinger, San Francisco, Calif.

Application May 6, 1952, Serial No. 286,300

2 Claims. (Cl. 74—423)

This invention relates to improvements in mechanical transmissions and more particularly to a novel mechanical combination by which two unconnected shafts positioned at right angles to one another and lying in the same plane may be simultaneously rotated.

An object of my invention is to provide an improved mechanical transmission which embodies a novel combination in which two aligned shafts, one a driving shaft and the other a driven shaft, are so mechanically connected that their simultaneous rotation may be effected along with a third shaft located in the same plane and at right angles to the said driving and driven shafts.

Other and further objects of my invention will be pointed out hereinafter, or will be indicated in the appended claims, or will be obvious to one skilled in the art upon an understanding of the present disclosure. For the purposes of this application I have elected to show herein certain forms and details of a mechanical transmission representative of my invention; it is to be understood, however, that the embodiment of my invention herein shown and described is for the purpose of illustration only, and that therefore it is not to be regarded as exhaustive of the variations of the invention.

In the accompanying drawings the figure is a longitudinal sectional view taken through my novel transmission.

Referring to the drawings, the numeral 1 designates a supporting base. Mounted on a supporting structure 2 secured to the base is a tubular member 3 through which a shaft 4 extends. The shaft is supported within a group of anti-friction ball bearings 5. Supported on and secured to the base is a semi-circular yoke 6 which is preferably made in two sections, the said sections being bolted together as at 7.

Rotatably extending through and supported by the yoke 6 are driving and driven shafts 8 and 9. The driving and driven shafts are in alignment with one another and they are also positioned in the same plane as the shaft 4.

Secured to the inner ends of the shafts 8 and 9, respectively, are bevel gears 10 and 11. The bevel gear 10 secured to the driving shaft 8 is in mesh with a similar bevel gear 12, and the bevel gear 11 secured to the driven shaft 9 is in mesh with a similar gear 13. The bevel gears 12 and 13 are, in turn, in mesh with one another.

The bevel gears 10, 11, 12, and 13 are all of the same general construction. The bevel gear 10 comprises a dome shaped outer section 10' and a hollow inner section 10a which has teeth arranged circularly on its outer surface. The outer and inner sections 10' and 10a are secured together by screws 10b, and the adjacent ends of the said sections are formed with saw teeth edges which mesh with one another to avoid independent rotation of either section. The inner section 10a is formed with a rounded inner end as at 10c which is rotatably supported in a concave bearing member 10d that is suitably secured to the tubular member 3. The dome shaped outer section 10' rotatably fits inside a concave seat 10e formed in the yoke 6. Suitable anti-friction ball bearings 10f are interposed between the dome shaped ends of the sections 10' and 10a and their respective seats to reduce friction to a minimum.

The bevel gear 11 comprises a dome shaped outer section 11' and a hollow inner section 11a which has gear teeth arranged circularly on its outer surface. The outer and inner sections 11' and 11a are secured together by screws 11b, and the adjacent ends of the said sections are formed with saw teeth edges which mesh with one another to avoid independent rotation of either section. The inner section 11a is formed with a rounded inner end as at 11c which is rotatably supported in a concave bearing member 11d that is suitably secured to the tubular member 3. The dome shaped outer section 11' rotatably fits inside a concave seat 11e formed in the yoke 6. Suitable anti-friction ball bearings 11f are interspersed between the dome shaped ends of the sections 11' and 11a and their respective seats to reduce friction to a minimum.

The bevel gear 12 comprises a dome shaped outer section 12' and a hollow inner section 12a which has gear teeth arranged circularly on its outer surface. The outer and inner sections 12' and 12a are secured together by screws 12b, and the adjacent ends of the said sections are formed with saw teeth edges which mesh with one another to avoid independent rotation of either section. The inner section 12a is formed with a rounded inner end as at 12c which is rotatably supported in a concave bearing member 12d that is suitably secured to the tubular member 3. The dome shaped outer section 12' rotatably fits inside a concave seat 12e formed in the yoke 6. Suitable anti-friction ball bearings 12f are interposed between the dome shaped ends of the sections 12' and 12a and their respective seats to reduce friction to a minimum.

The bevel gear 13 comprises a dome shaped outer section 13' and a hollow inner section 13a which has gear teeth arranged circularly on its outer surface. The outer and inner sections 13' and 13a are secured together by screws 13b, and the adjacent ends of the said sections are formed with saw teeth edges which mesh with one another to avoid independent rotation of either section. The inner section 13a is formed with a rounded inner end as at 13c which is rotatably supported in a concave bearing member 13d that is suitably secured to the tubular member 3. The dome shaped outer section 13' rotatably fits inside a concave seat 13e formed in the yoke 6. Suitable anti-friction ball bearings 13f are interposed between the dome shaped ends of the sections 13' and 13a and their respective seats to reduce friction to a minimum.

It will be noted that by the arrangement of the intermeshing train of gears in the manner described, the driven shaft 9 is rotated by the driving shaft 8, while at the same time the shaft 4 is free to rotate without interference.

What I claim is:

1. In a transmission of the kind characterized for bridging a rotatable shaft, a base member, a semi-circular supporting yoke mounted on the base, a central tubular structure inside the yoke, a shaft supported inside the tubular structure, a drive shaft extending through one side of the yoke, a driven shaft extending through the opposite side of the yoke, the said drive and driven shafts being in alignment, a gear connected to the inner end of the drive shaft and arranged between the yoke and the tubular structure, the said gear having rounded semi-globular ends, the said semi-globular ends being rotatably supported in concave seats carried by the yoke and the tubular structure, a second gear connected to the inner end of the driven shaft and arranged between the yoke and the tubular structure, the said second gear having rounded semi-circular globular ends, the said semi-globular ends of the second gear being rotatably supported in concave seats carried by the yoke and the tubular structure, a third gear interposed between the yoke and the tubular structure and arranged in meshed relationship with the first mentioned gear, the said third gear having rounded semi-circular globular ends, the said semi-globular ends of the third gear being rotatably supported in concave seats carried by the yoke and the tubular structure, and a fourth gear interposed between the yoke and the tubular structure and arranged between and in mesh with the said second and third gears, the said fourth gears having rounded semi-circular globular ends, the said semi-globular ends of the fourth gear being rotatably supported in concave seats carried by the yoke and the tubular structure.

2. In a transmission of the kind characterized, a base plate, a substantially semi-circular supporting yoke mounted on and extending above the base plate, a shaft, a tubular shaft supporting member secured to the base plate and mounted inside the semi-circular supporting yoke, a rotatable shaft journaled in the upright shaft supporting member, a drive shaft extending through one side of the yoke, a driven shaft extending through the opposite side of the yoke, the said drive and driven shafts being in substantial alignment and the said drive and driven shafts being disposed at substantially right angles to the first mentioned rotatable shaft, a gear connected to the inner end of the drive shaft and arranged between the yoke and the tubular shaft supporting member, the said gear having rounded semi-globular end portions, the said semi-globular end portions being rotatably supported in concave seats carried by the yoke and the tubular member, a second gear connected to the inner end of the driven shaft and arranged between the yoke and the tubular member, the said second gear having rounded semi-globular end portions, the said semi-globular end portions of the second gear being rotatably supported in concave seats carried by the yoke and the tubular member, and a plurality of connecting gears meshing with one another and disposed between the yoke and the tubular member, two of such connecting gears being in mesh with the gears secured to the drive and driven shafts, respectively, the said connecting gears having semi-globular end portions rotatably seated in concave seats carried by the yoke and the tubular member.

JOHN H. HULLINGER.

References Cited in the file of this patent

UNITED STATES PATENTS

| Number | Name | Date |
|---|---|---|
| 1,479,157 | Short | Jan. 1, 1924 |

FOREIGN PATENTS

| Number | Country | Date |
|---|---|---|
| 881,416 | France | Jan. 22, 1943 |